United States Patent [19]

Nakazawa

[11] Patent Number: 5,590,265
[45] Date of Patent: Dec. 31, 1996

[54] SYSTEM WHICH CAN DISPLAY MULTIWINDOWS AND ITS WINDOW DOSPLAY METHOD

[75] Inventor: Toshiyuki Nakazawa, Kawasaki, Japan

[73] Assignee: Canon Kabushiki Kaisha, Tokyo, Japan

[21] Appl. No.: 95,218

[22] Filed: Jul. 23, 1993

[30]     Foreign Application Priority Data

Jul. 27, 1992  [JP]  Japan .................................. 4-219750

[51] Int. Cl.⁶ .................................................... G06F 3/14
[52] U.S. Cl. ........................... 395/340; 395/344; 395/356
[58] Field of Search ...................................... 395/157, 158, 395/156, 160, 155, 161, 159; 345/119, 120, 113, 114

[56]                  References Cited

U.S. PATENT DOCUMENTS

| | | | |
|---|---|---|---|
| 4,806,919 | 2/1989 | Nakayama et al. | 345/120 |
| 4,914,607 | 4/1990 | Takanashi et al. | 395/158 |
| 4,954,818 | 9/1990 | Nakane et al. | 345/120 |
| 5,191,644 | 3/1993 | Takeda | 395/158 |
| 5,283,560 | 2/1994 | Bartlett | 345/113 |
| 5,377,317 | 12/1994 | Bates et al. | 395/157 |
| 5,390,295 | 2/1995 | Bates et al. | 395/157 |
| 5,425,141 | 6/1995 | Gedye | 395/157 |

*Primary Examiner*—Raymond J. Bayerl
*Assistant Examiner*—Crescelle N. dela Torre
*Attorney, Agent, or Firm*—Fitzpatrick, Cella, Harper & Scinto

[57]                  ABSTRACT

When a plurality of windows are displayed on the same screen in a the first display format such that the content of the window of the highest hierarchy is displayed in the portion where two or more windows of lower hierarchy are overlapped, and when a process to make the windows transparent is instructed, each window displayed in the first display format is displayed at the display position in the first display format by a second display format such that the frames of the other windows which are overlapped in each window are displayed in the portion where two or more windows are overlapped except the contents in the frame of the window. When one of the title bars displayed in the second display format is selected, the window having the selected title bar is set to the window of the highest hierarchy and each of the above windows is displayed in the first display format.

4 Claims, 6 Drawing Sheets

SYSTEM WHICH CAN DISPLAY MULTIWINDOWS AND ITS WINDOW DOSPLAY METHOD

BACKGROUND OF THE INVENTION

1. Field of the Invention

The present invention relates to a display method of windows in a system which can display multiwindows.

2. Related Background Art

In a computer system, an overlapped window method whereby the overlapping of windows is permitted is known as a display method of multiwindows in which different works can be executed in the respective windows.

FIG. 7 is a diagram for explaining a display state of windows by such an overlapped window method. In the diagram, a plurality of windows 11, 12, ... are overlapped and displayed on a screen 20 so as to have a hierarchical structure. The window 11 of the uppermost layer is a window which is selected at present. The second window 12 a part of which is shielded by the first window 11 is displayed. Further, a third window 13 a part of which is shielded by the first and second windows 11 and 12 is also displayed. Although not displayed on the screen 20, the fourth and subsequent windows which are completely shielded by the first to third windows 11, 12, and 13 also exist. Each window is constructed by a title bar, a frame to specify the boundary of the window, a work area, and the like. The changing operation to change the size and position of each window and the selecting operation of a window which is not selected at present are defined.

As shown in FIG. 6, the windows which are displayed on the screen 20 by the overlapped window method have a hierarchical structure. Each window has not only its internal data D but also a pointer $P_1$ for a child window which belongs to the window and a pointer $P_2$ for the windows of the lower hierarchical layers. On the screen 20, in FIG. 6, the window (for example, W11) located in the higher layer is displayed in a state such that it shields the window (for instance, W12) located in the lower layer. In the hierarchical layer, in the diagram, the window (for example, W21) located at a position on the rightmost side is displayed in a state such that it shields the window (for example, W11) located on the left side.

In the above conventional overlapped window method, when another larger window is perfectly overlapped on a certain window, in order to confirm and select the window existing under such a large window, it is necessary to execute either one of the operations of the following items shown below.

(1) The size and position of the window existing in the highest layer are changed, thereby setting a target window existing in a lowest layer portion can be confirmed by a visual sense on the screen. In this state, a cursor of a mouse is moved to the corresponding window portion and the operation such as to click a mouse desired operation button of the mouse or the like is executed and a proper window existing in the lower position, thereby selecting the window existing in the lowest layer portion.

(2) The windows displayed at present on the screen are sequentially selected by executing special operations. The above selecting operation is repeated until the target window is displayed in the uppermost layer.

(3) A list of the window names displayed at present on the screen is displayed on the screen by a special operation. The desired window name is selected from such a list and the window of the selected name is displayed in the uppermost layer of the screen.

However, in the conventional selecting works of the windows mentioned in the above items (1) to (3), according to the step (1), the selecting operations are complicated. According to the above item (2), when a number of windows exist on the screen, it is necessary to repeat a number of operations until a target window is displayed, so that the desired window cannot be quickly selected. According to the above item (3), the selecting operation must be performed on the basis of the name of window irrespective of the existing positions of the windows on the display screen, so that the selecting operation is not intuitive.

SUMMARY OF THE INVENTION

It is, therefore, an object of the invention to provide a system in which a window of the lowest layer which is completely shielded by the window of the highest layer can be confirmed by a simple operation.

Another object of the invention is to provide a system in which a window of the lowest layer which is completely shielded by the window of the highest layer can be selected by a simple operation.

Still another object of the invention is to provide a system which can easily recognize the positional relations among a plurality of overlapped windows.

According to one aspect, the present invention which achieves those objectives relates to a system which can display multiwindows, the system comprises window information memory means for storing the content and display position of each window with respect to a plurality of windows and the upper/lower relations among the windows; first display control means for allowing a plurality of windows to be displayed on the same screen in a manner such that the content of the window of the uppermost layer is displayed in the portion where two or more windows are overlapped with reference to the information stored in the window information memory means; instructing means for instructing to make the windows transparent in a state in which a plurality of windows are displayed on the same screen by the first display control means; and second display control means for allowing each of the windows displayed by the first display control means to be displayed at the display position displayed by the first display control means in response to the instruction of the instructing means with reference to the information stored in the window information memory means in a manner such that the frames of the other windows overlapped in each window are displayed in the portion where two or more windows are overlapped except the contents in the frames of the windows.

According to another aspect, the present invention which achieves those objectives relates to a display method of multiwindows, comprising the steps of: storing the content and display position of each window with respect to a plurality of windows and the upper/lower relations among the windows into a window information memory; displaying a plurality of windows onto the same screen by a first display format such that the content of the window of the highest layer is displayed in the portion where two or more windows are overlapped with reference to the information stored in the window information memory; instructing to make the windows transparent in a state in which a plurality of windows are displayed on the same screen by the first display format; and displaying each window displayed by the first display format to the display position in the first display format by a second display format such that the frames of the other windows which are overlapped in each window are displayed in the portion where two or more windows are overlapped except the contents in the frames of the windows with reference to the information stored in the window information memory.

Other objectives and advantages besides those discussed above shall be apparent to those skilled in the art from the description of a preferred embodiment of the invention which follows. In the description, reference is made to accompanying drawings, which form a part thereof, and which illustrate an example of the invention. Such an example, however, is not exhaustive of the various embodiments of the invention, and therefore reference is made to the claims which follow the description for determining the scope of the invention.

DESCRIPTION OF THE PREFERRED EMBODIMENTS

A construction and operation of a computer system according to an embodiment of the invention will now be described hereinbelow with reference to the drawings.

Figure 1:
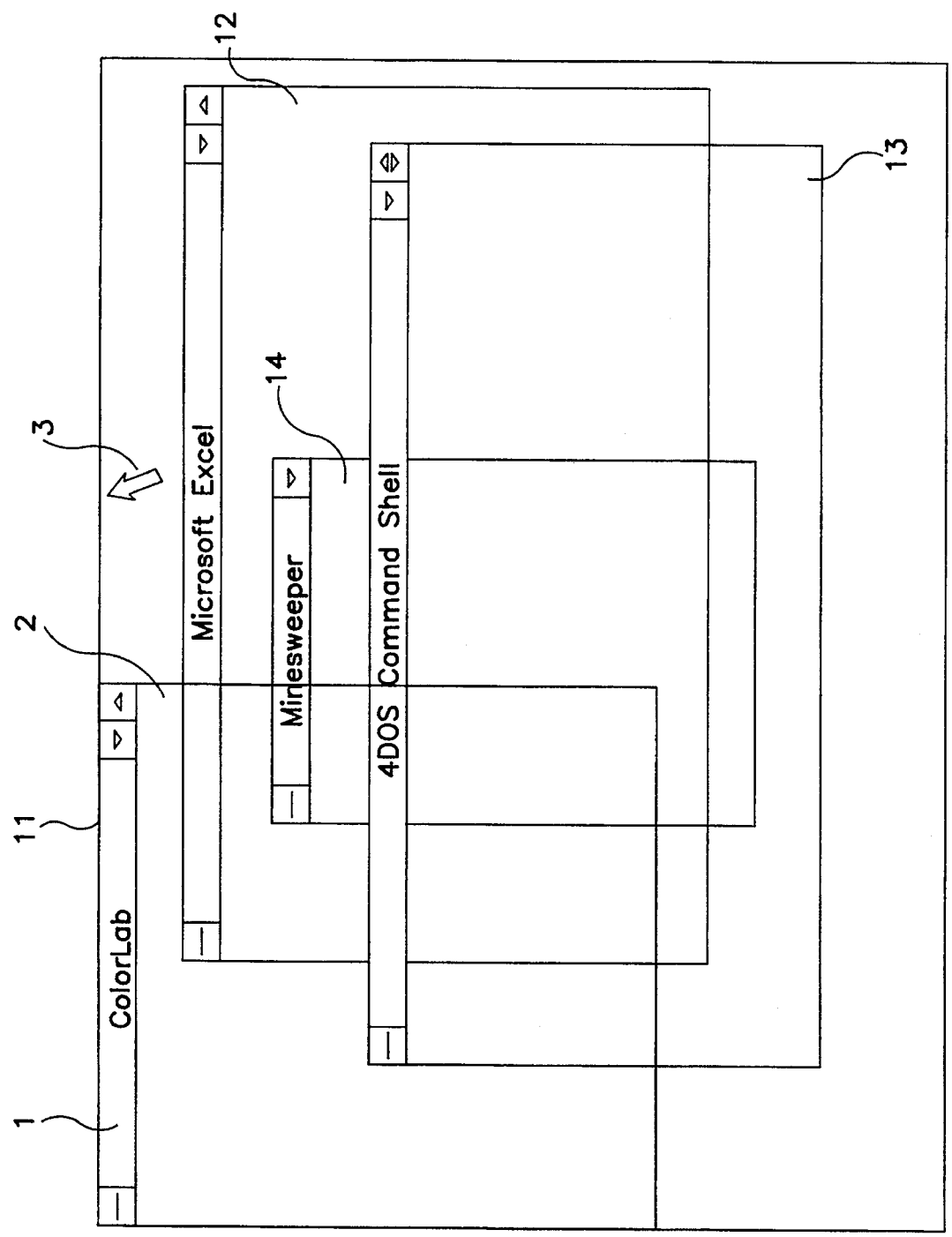
FIG. 1 is a diagram showing a display example of windows which were made transparent.
Figure 2:
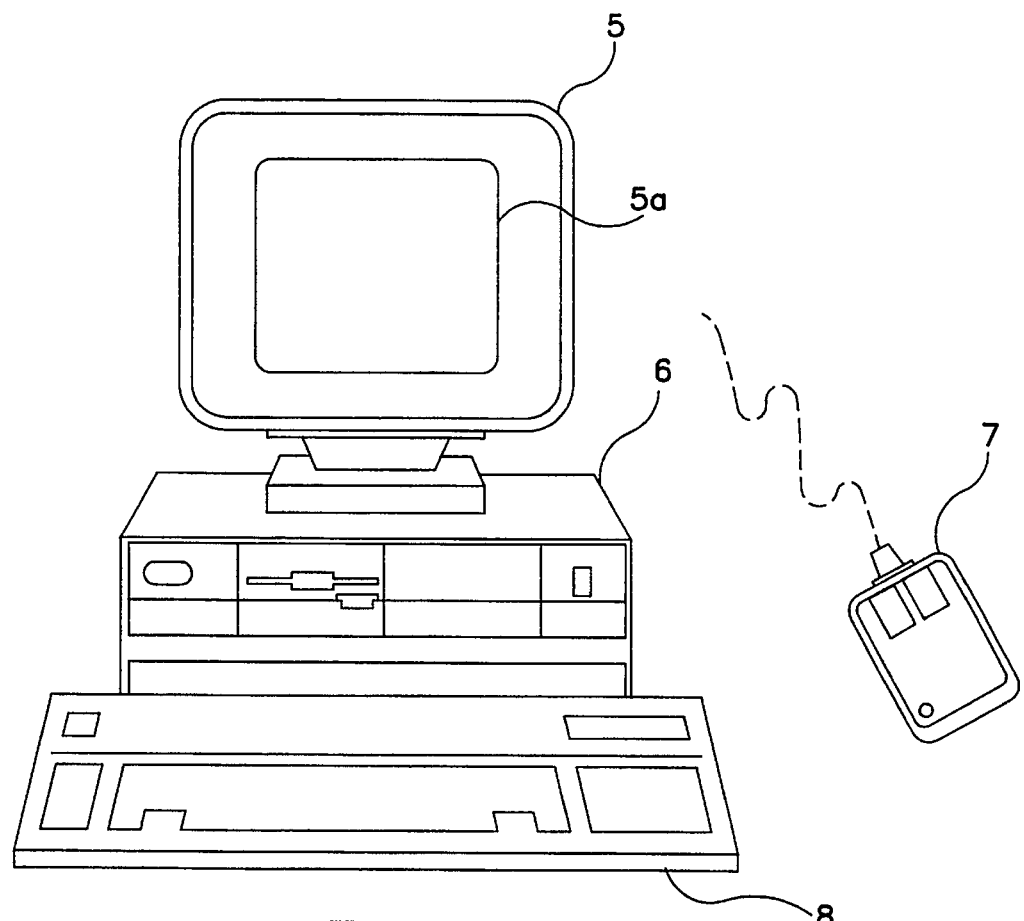
FIG. 2 is an external view of a system of an embodiment.
Figure 4:
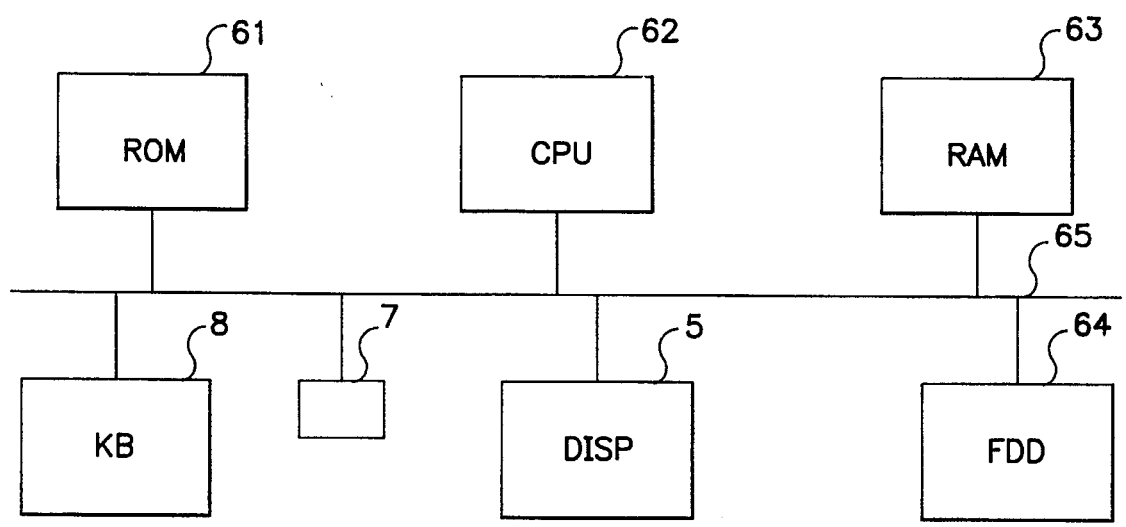
FIG. 4 is a block diagram showing a system of the embodiment.
Figure 3:
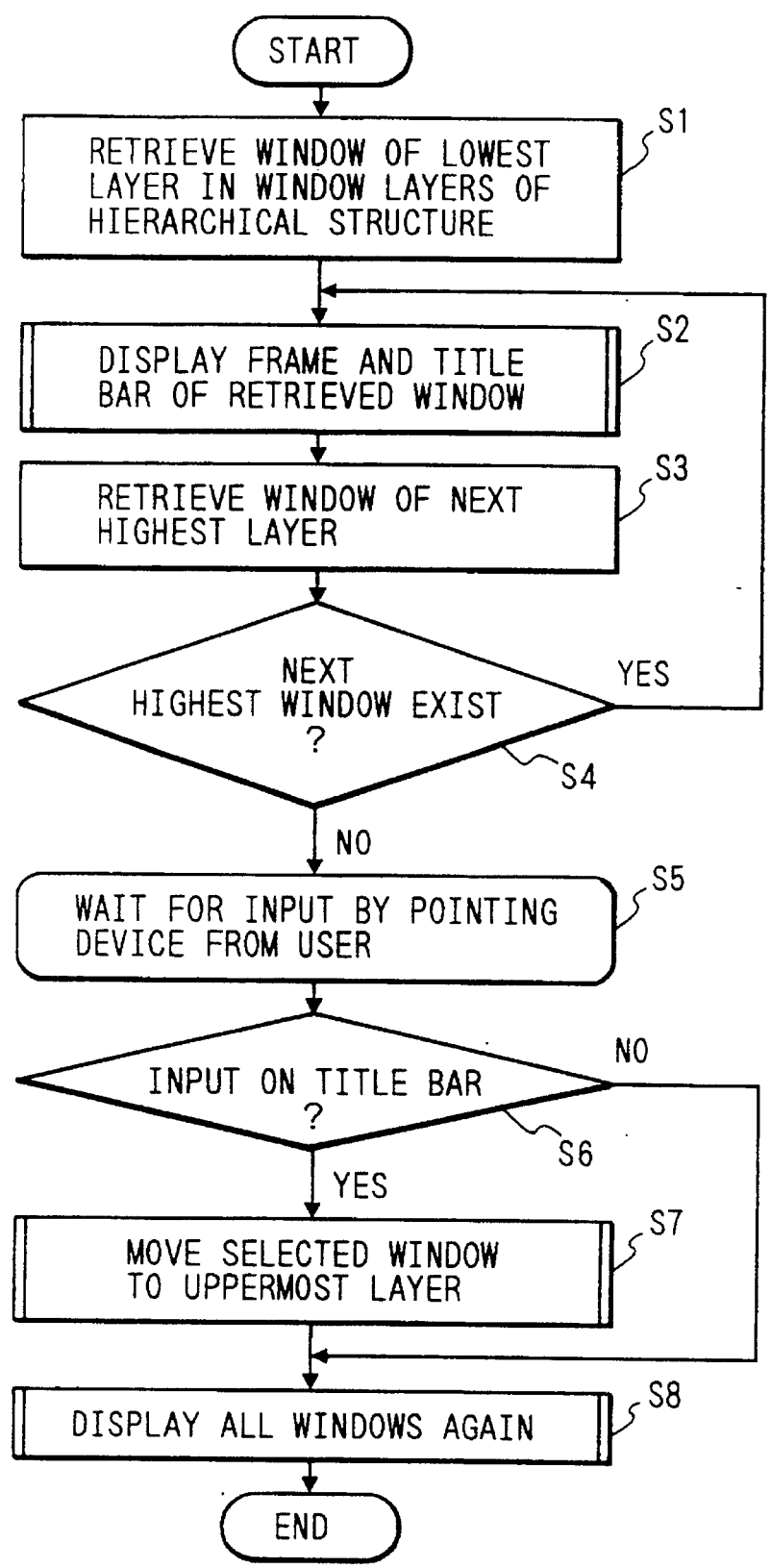
FIG. 3 is a flowchart for a process to make windows transparent and a process to select the transparent windows.

FIG. 1 is a diagram showing a display example of windows which were made transparent. FIG. 2 is an external view of a system of the embodiment. FIG. 3 is a flowchart for a process to make the windows transparent and a process to select the transparent windows. FIG. 4 is a diagram showing a block construction of the system of the embodiment.

As shown in FIG. 2, in the computer system, a keyboard 8 to execute an inputting operation upon operation is attached to a computer main body 6. A mouse 7 as a pointing device is also provided. A display apparatus 5 to display information on a screen 5a is connected to the computer main body 6. The computer main body 6 can execute the following processes by the operations of the keyboard 8 or mouse 7. Namely, the computer performs a transparency making process to make the portions other than the frames and title bars of all of the windows which are displayed on the screen 5a transparent as will be explained hereinlater. The computer also executes the selection display process for selecting a target window from all of the transparent windows and displaying the target window to be displayed in the uppermost layer on the screen 5a.

Figure 6:
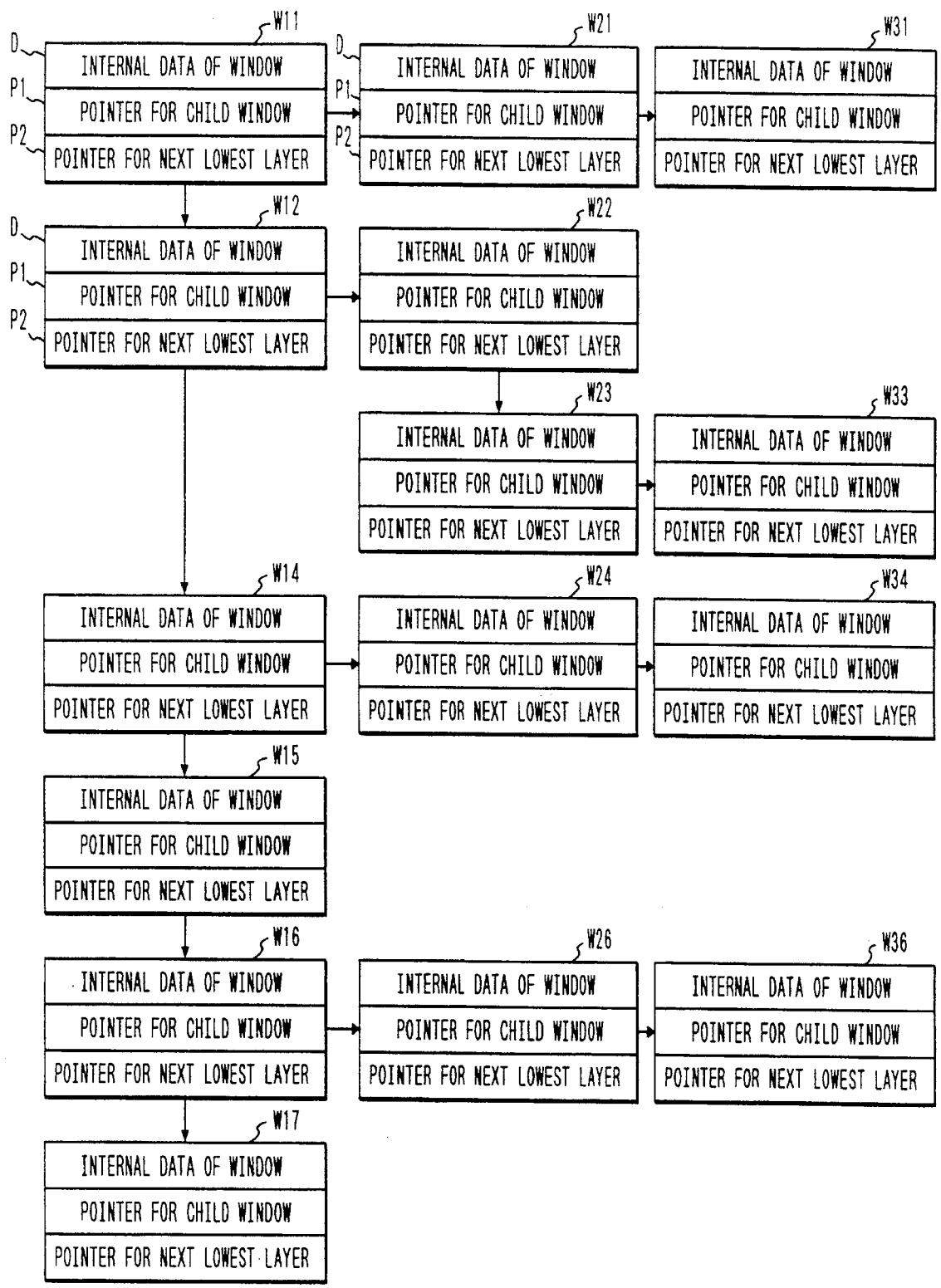
FIG. 6 is a diagram for explaining a hierarchical structure of windows.

In FIG. 4, an ROM 61 stores various kinds of processing procedures including the processing procedure shown in FIG. 3. A CPU 62 executes the processing procedures stored in the ROM 61. An RAM 63 stores various kinds of data including the information about the hierarchical relation of the windows and the information regarding the window such as position and size of each window as shown in FIG. 6. A floppy disc drive 64 non-volatilely stores various data. A bus 65 connects each section of the system. The above devices are provided in the computer main body 6.

Figure 7:
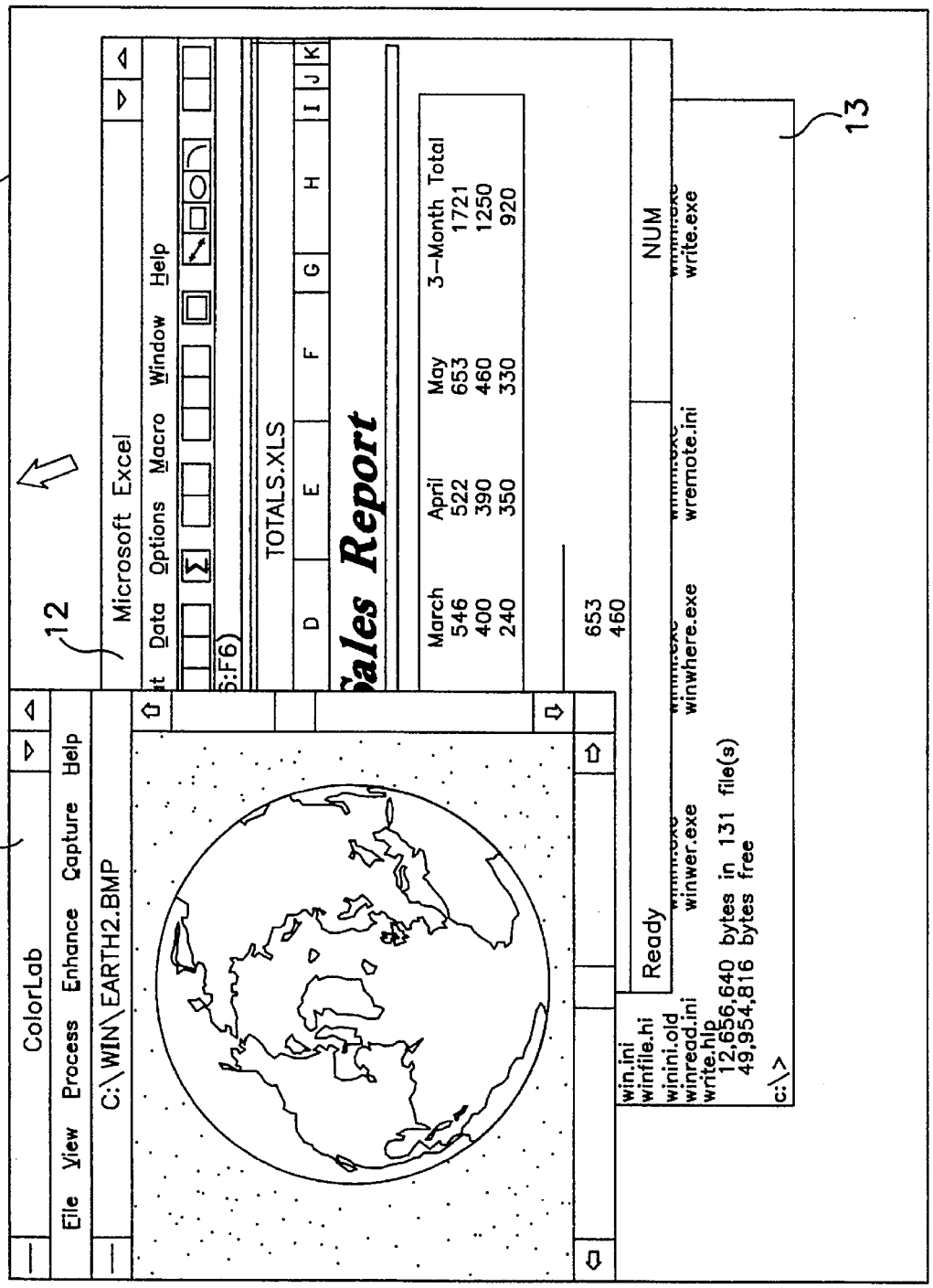
FIG. 7 is a diagram showing a conventional display example of windows.

When a plurality of windows are opened, a plurality of windows are displayed in a hierarchical layer manner in an overlapped state on the screen 5a in a manner similar to the conventional case which has already been described in FIG. 7. By executing a special operation as shown below from such an overlapped state, for example, (1) the operation of a control key existing in the keyboard 8 or operations of a combination of keys (control key+shift key) are executed, (2) a predetermined operation button existing on the right side or at the center of the mouse 7 is clicked, (3) the operation button of the mouse 7 is clicked while pressing a special key (control key or shift key) of the keyboard 8, or (4) a cursor of the mouse 7 is moved to a portion which does not belong to any window on the screen and a predetermined operation button of the mouse 7 is clicked, the windows which were overlapped and displayed on the screen 5a is made transparent. A target window is selected or displayed by executing operations similar to those for the title bar of the window.

The operation of the system of the embodiment will now be described with reference to the flowchart of FIG. 3. When the above special operations are executed, in step S1, the window of the lowest layer in the window layers of the hierarchical structure is retrieved. In step S2, only the frame and title bar of the window retrieved in step S1 are displayed on the screen 5a. In step S3, the window of the next highest layer in the lowermost layer in the window hierarchical structure is retrieved. A check is made in step S4 that such a window exists or not. If YES, only the frame and title bar of such a window are similarly displayed on the screen 5a. The display operation of only the frame and title bar is sequentially executed hereinbelow until the window of the uppermost layer is searched. In step S5, the apparatus is set into a standby mode to wait for the input by the mouse 7 which is executed by the user. The windows 11 to 14 are displayed on the screen 5a in this instance as shown in FIG. 1. When explaining with regard to the window 11 of the same diagram, only a frame 2 and a title bar 1 of the window 11 are shown.

In FIG. 1, reference numeral 3 denotes a cursor of the mouse 7, and 14 indicates a window which was perfectly shielded by the other windows hitherto. In step S6, when data is inputted by the mouse 7 onto the title bar of the target window on the screen 5a, the processing routine advances to the next step S7. In step S7, the hierarchical structure of the windows is changed so as to move the selected window to the uppermost layer of the screen 5a. In step S8, all of the windows are repeatedly displayed. The windows are displayed on the screen 5a while setting the selected window to the uppermost position by an overlapped window method in a manner similar to that shown in FIG. 7. When the inputting operation is executed by the mouse 7 at a position other than the title bar in step S6, the windows are again displayed without changing the hierarchical structure of the windows.

Figure 5:
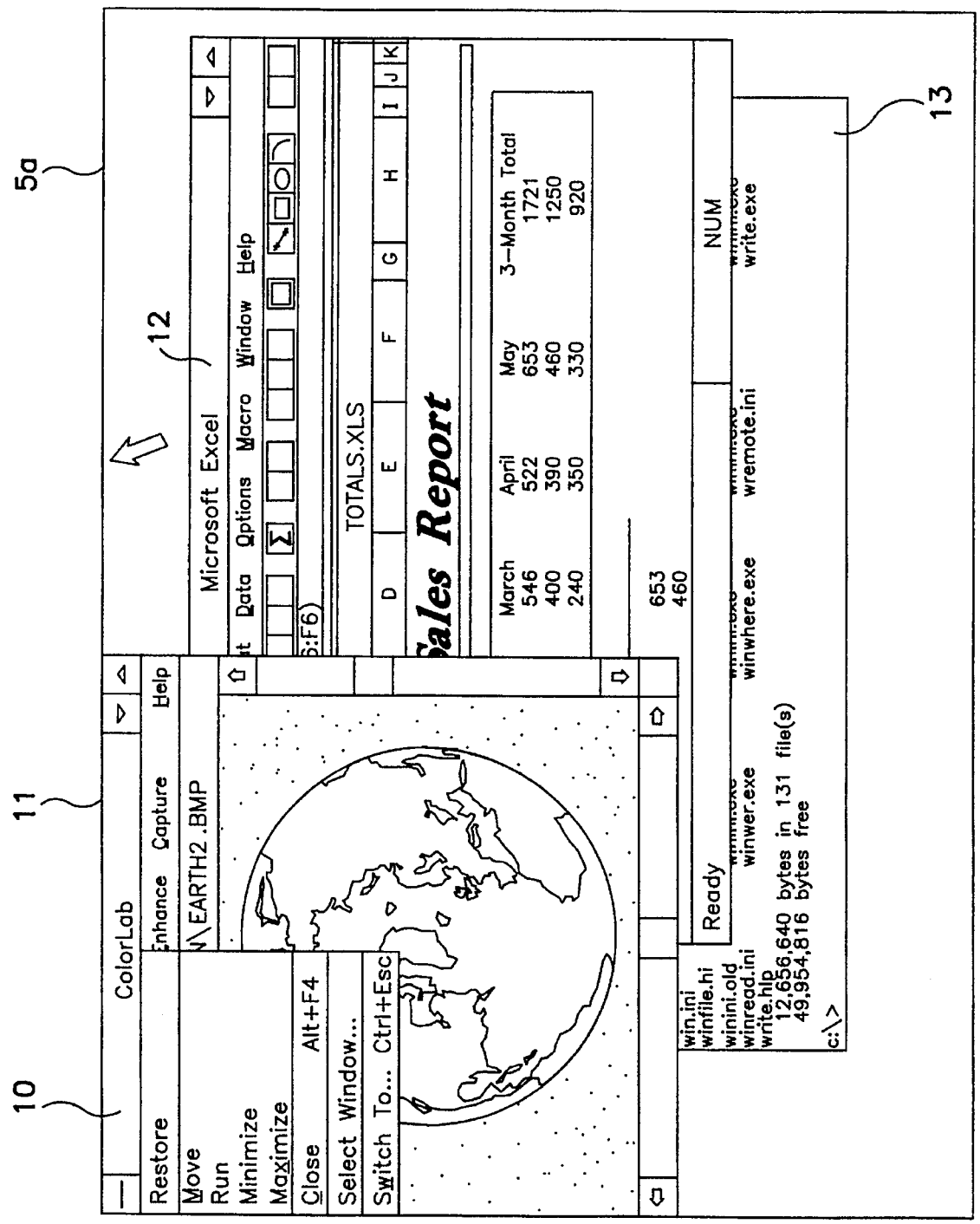
FIG. 5 is a diagram showing a display state of a screen according to another embodiment.

Another embodiment of the invention will now be described with reference to FIG. 5. FIG. 5 is a diagram for explaining a display state of the screen in the embodiment.

In the embodiment, as shown in FIG. 5, a system menu 10 is provided for the window which is displayed on the screen 5a. In the system menu 10, an item of "Select Window" to activate the operation to "make the windows transparent and select the window" is included. The constructions of the other portions in the embodiment are substantially the same as those in the foregoing first embodiment. In the embodiment, when the relevant menu item is selected by the mouse 7, the portions other than the title bars and frames of the windows displayed on the screen 5a are made transparent by the transparency making means. Only the title bars and frames of all of the windows are displayed on the screen 5a as shown in FIG. 1 in a manner similar to the first embodiment mentioned above. Therefore, when the portion of the title bar of the target window is selected by the mouse 7, the window selected is set to the topmost layer in a manner similar to the first embodiment. A screen display state similar to FIG. 7 is obtained.

As mentioned above, the window of the lowest layer which is perfectly shielded by the window of the highest layer can be confirmed by the simple operation. The positional relations among a plurality of overlapped windows can be easily recognized. The window of the lowest layer confirmed can be selected by the simple operation.

Although the present invention has been described in its preferred form with a certain degree of particularity, many apparently widely different embodiments of the invention can be made without departing from the spirit and the scope thereof. It is to be understood that the invention is not limited to the specific embodiments thereof except as defined in the appended claims.

What is claimed is:

1. A system which can display multiwindows, comprising:

window information memory means for storing a content and a display position of each of a plurality of windows and a higher/lower hierarchy among the windows;

first display control means for allowing the plurality of windows to be displayed on a same screen in a manner such that the content of a window with a higher hierarchy is displayed to overlap two or more windows of a lower hierarchy based on information stored in said window information memory means;

instructing means for providing instructions to display the windows in a transparent state in which the plurality of windows are displayed on the same screen by said first display control means; and second display control means, which operates in response to the instructions of said instructing means, for allowing each window, except for contents within frames of the windows, to be displayed based on the hierarchy information stored in said window information memory means in a manner such that frames of lower hierarchy windows are overlapped by frames of higher hierarchy windows and are displayed with a title bar including a window name on the basis of a higher/lower hierarchy among the windows stored in said window information memory means.

2. A system according to claim 1, further comprising:

selecting means for selecting one of the title bars displayed by said second display control means; and third display control means for updating the contents stored in said window information memory means so as to set the window having the selected title bar to the window of the highest hierarchy and allowing each of the windows to be displayed in the display position displayed by said first display control means on the basis of the updated contents of the information stored in said window information memory means.

3. A display method of multiwindows, comprising the steps of:

storing a content and a display position of each of a plurality of windows and a higher/lower hierarchy among the windows into a window information memory;

displaying a plurality of windows on a same screen by a first display format such that the content of a window of the highest hierarchy is displayed to overlap two or more windows of a lower hierarchy based on information stored in the window information memory;

instructing to display the windows in a transparent state in which the plurality of windows are displayed on the same screen in the first display format; and displaying each window, in response to the transparent state instruction, in the first display format except for the contents within the frames of the windows at the display position displayed in the first display format based on the hierarchy information stored in the window information memory in a manner such that frames of lower hierarchy windows are overlapped by frames of higher hierarchy windows and are displayed with a title bar including a window name.

4. A method according to claim 3, further comprising the steps of:

selecting one of the title bars displayed in the second display format; and updating the contents stored in the window information memory by a third display format so as to set the window having the selected title bar to the window of the highest hierarchy and allowing each of the windows to be displayed in the display position displayed by the first display control format on the basis of the updated contents of the information stored in the window information memory.

* * * * *

UNITED STATES PATENT AND TRADEMARK OFFICE
CERTIFICATE OF CORRECTION

PATENT NO.    : 5,590,265
DATED         : December 31, 1996
INVENTOR(S)   : Nakazawa It is certified that error appears in the above-indentified patent and that said Letters Patent is hereby corrected as shown below:

On title page, item
[54]  TITLE OF THE INVENTION:

Line 3, "DOSPLAY" should read --DISPLAY--.

COLUMN 1:

Line 3, "DOSPLAY" should read --DISPLAY--.

Signed and Sealed this

Fifteenth Day of July, 1997

Attest:

BRUCE LEHMAN

Attesting Officer    Commissioner of Patents and Trademarks